(12) United States Patent
Bentall

(10) Patent No.: US 9,781,076 B2
(45) Date of Patent: Oct. 3, 2017

(54) SECURE COMMUNICATION SYSTEM

(75) Inventor: Mark Bentall, Newport (GB)

(73) Assignee: CASSIDIAN LIMITED, Newport (GB)

( * ) Notice: Subject to any disclaimer, the term of this patent is extended or adjusted under 35 U.S.C. 154(b) by 1161 days.

(21) Appl. No.: 12/735,483

(22) PCT Filed: Jan. 19, 2009

(86) PCT No.: PCT/GB2009/000136
§ 371 (c)(1),
(2), (4) Date: Oct. 12, 2010

(87) PCT Pub. No.: WO2009/090409
PCT Pub. Date: Jul. 23, 2009

(65) Prior Publication Data
US 2011/0035578 A1 Feb. 10, 2011

(30) Foreign Application Priority Data
Jan. 17, 2008 (GB) .................................. 0800838.5

(51) Int. Cl.
*H04L 29/06* (2006.01)
(52) U.S. Cl.
CPC ...... *H04L 63/0227* (2013.01); *H04L 63/0428* (2013.01); *H04L 63/105* (2013.01)
(58) Field of Classification Search
USPC ........................................................ 713/154
See application file for complete search history.

(56) References Cited

U.S. PATENT DOCUMENTS

| | | | | |
|---|---|---|---|---|
| RE39,360 E | * | 10/2006 | Aziz et al. | 713/150 |
| 7,296,291 B2 | * | 11/2007 | Tahan | 726/11 |
| 7,363,656 B2 | * | 4/2008 | Weber et al. | 726/23 |
| 7,441,262 B2 | * | 10/2008 | Hui et al. | 726/1 |
| 7,680,115 B2 | * | 3/2010 | Klish, II | 370/392 |
| 2002/0152373 A1 | * | 10/2002 | Sun et al. | 713/150 |
| 2005/0010766 A1 | * | 1/2005 | Holden et al. | 713/166 |
| 2006/0072543 A1 | * | 4/2006 | Lloyd et al. | 370/351 |
| 2007/0276958 A1 | * | 11/2007 | Curtis et al. | 709/238 |

FOREIGN PATENT DOCUMENTS

| | | |
|---|---|---|
| EP | 1484887 A2 | 12/2004 |
| EP | 1772998 A2 | 4/2007 |
| EP | 1830517 A1 | 9/2007 |

OTHER PUBLICATIONS

PCT International Search Report and Written Opinion in related PCT Application No. PCT/GB2009/000136 dated Jul. 27, 2009.

(Continued)

*Primary Examiner* — Jason C Chiang
(74) *Attorney, Agent, or Firm* — Carlos A. Fisher; Stout, Uxa & Buyan, LLP

(57) ABSTRACT

A communications system (40) comprises a first entity (42), a first encryption device (48) and a network (46). The first encryption device (48) is adapted to decrypt, using a first decryption algorithm, data sent from a first destination to said first entity via said network (46). The first encryption device (48) is adapted to pass network metric data concerning at least one route between said first entity and said first destination to said first entity without subjecting said network metric data to said first decryption algorithm.

14 Claims, 4 Drawing Sheets

(56) References Cited

OTHER PUBLICATIONS

PCT International Preliminary Report on Patentability and Written Opinion dated Jul. 29, 2010 in related PCT Application No. PCT/GB2009/000136.
United Kingdom Search Report dated Apr. 29, 2008 in related UK Application No. GB0800838.5.
MNWG-MNE Issue 1 Draft, Sep. 2007, NCOIC, Network-Centric Operations Industry Consortium (NCOIC TM), Mobile Networking Evaluation (MNE), Issue No. 1 of vol. 1.

* cited by examiner

SECURE COMMUNICATION SYSTEM

This invention relates to secure communication systems.

The use of cryptography to provide secure communications between two entities over a network is well known in the art. FIG. 1 is a block diagram showing a typical communications system. The system of FIG. 1, indicated generally by the reference numeral 1, comprises a first entity 2, a second entity 4 and a third entity 6. The entities communicate via a network 8. The network could take many forms, such as an internal company network or the Internet. In the system 1, data sent from one of said entities to another is sent via the network 8 in encrypted form. Data emanating from the first entity 2 is encrypted by a first encryption device 10 and data sent to the first entity 2 via the network 8 is decrypted by the first encryption device 10. Similarly, data emanating from the second entity 4 is encrypted by a second encryption device 12 and data emanating from the third entity 6 is encrypted by a third encryption device 14. Furthermore, data sent to the second entity 4 via the network 8 is decrypted by the second encryption device 12 and data sent to the third entity 6 is decrypted by the third encryption device 14.

Thus, the network 8 transfers encrypted data between the entities 2, 4 and 6. Accordingly, provided that the encryption method is secure, messages transferred between users of the system 1 cannot be deciphered by third parties.

FIG. 2 shows a system, indicated generally by the reference numeral 20, that is a variant of the system 1. The system 20 comprises first 22, second 24, third 26 and fourth 28 entities, connected to a network 30 via encryption devices 32, 34, 36 and 38 respectively.

In the system 20, entities are arranged in groups and can only communicate with other entities in the same group. The first group comprises first and third entities 22 and 26: the second group comprises second and fourth entities 24 and 28.

The system 20 can be used to implement a secure data communication system in which different entities have different security classifications and are only able to communicate with other entities having the same security classification. Thus, a number of entities may, for example, be classified as one of low sensitivity, sensitive and highly sensitive. Entities classified as "low sensitivity" can communicate with other entities classified as "low sensitivity", but cannot communicate with any other entities. Similarly, entities classified as "sensitive" can only communication with other entities classified as "sensitive" and entities classified as "highly sensitive" can only communicate with other entities classified as "highly sensitive".

Since all data transferred over the network 30 is encrypted, the network is secure, provided that the encryption is secure.

The inventor has realised that the architecture of prior art systems such as the systems 1 and 20 described above prevents the entities from obtaining information concerning the network itself. Information that entities may wish to obtain includes, but is not limited to, the cost of using the network or a particular path over the network (either in terms of a financial cost, effort or some other routing metric) and the quality-of-service offered by the network or network path; such data is often referred to generally as network metric data or network metrics. For example, if the network makes use of expensive satellite communications, then an entity may decide not to make use of that network for a particular communication. The systems 1 and 20 described above simply provide no mechanism to enable metric data concerning the network itself to be transmitted to the entities.

The present invention seeks to address at least some of the problems identified above.

The present invention provides a communications system comprising a first entity, a first encryption device and a network, wherein said first encryption device is adapted to decrypt, using a first decryption algorithm, data sent from a first destination to said first entity via said network; characterised in that said first encryption device is adapted to pass network metric data concerning at least one route between said first entity and said first destination to said first entity without subjecting said network metric data to said first decryption algorithm.

It will be appreciated that the destination may, for example, refer to a network, host or application.

The present invention also provides a method of operating a secure communications system in which one or more entities send data to one or more other entities of the system via a network, wherein at least some of said data is encrypted and decrypted using encryption and decryption algorithms, the method comprising the step of sending network metric data (often referred to as metric metrics) from said network to one or more of said entities without subjecting the network metric data to said decryption algorithms.

The network metric data describes attributes of the network, such as data transfer cost data or quality-of-service data. The network metric data could, of course, take many others forms as is well known in the art.

By passing metric data from the network to an entity in an unencrypted form, the entities are given ready access to this useful data. Also, there is no requirement for the network metric data to be manipulated either at the network or at the entity concerned. The arrangement of the present invention involves unencrypted data passing from the network to entities, but does not require any unencrypted data to pass from entities to the network.

The first encryption device may be adapted to encrypt data sent by the first entity via the network using a first encryption algorithm.

In many forms of the invention, the first encryption device is adapted to both encrypt data passing from an entity to the network and to decrypt data passing from said network to the entity. In this way, secure two-way communication between entities can be provided.

In one form of the invention, the first encryption device is adapted to block network metric data that is not one of a predetermined set of data words. Such an arrangement has the advantage of reducing the exposure of the entities to malicious data, such as viruses and Trojans, passing from the network to the entity in unencrypted form.

The system of the present invention may include a second entity and a second encryption device, wherein said second encryption device is adapted to encrypt data sent by said second entity via said network using a second encryption algorithm and/or decrypt data sent to said second entity via said network using a second decryption algorithm. The second encryption device may be adapted to pass network metric data to said second entity.

The system may comprise a second entity and a second encryption device, wherein said second encryption device is adapted to decrypt, using a second decryption algorithm, data sent from a second destination to said second entity via said network. The second encryption device may be arranged to encrypt data sent by said second entity via said network using a second encryption algorithm. The second encryption device may be adapted to pass network metric data concerning at least one route between said second entity and said second destination to said second entity without subjecting said network metric data to said second decryption algorithm.

As discussed above with reference to the first encryption device, the second encryption device may be adapted to block network metric data that is not one of a predetermined set of data words.

It may be that the first encryption and decryption algorithms are suitable for communications at a first security classification, and the second encryption and decryption algorithms are suitable for communications at a second, different, security classification.

The system of the present invention may further include a third entity and a third encryption device, wherein the third encryption device is adapted to encrypt data sent by said third entity via said network using a third encryption algorithm and/or decrypt data sent to said third entity via said network using a third decryption algorithm. The third encryption device may be adapted to pass network metric data to said third entity. The third encryption device may be adapted to block network metric data that is not one of a predetermined set of data words.

The system may comprise a third entity and a third encryption device, wherein the third encryption device is adapted to decrypt, using a third decryption algorithm, data sent from a third destination to said third entity via said network. The third encryption device may be arranged to encrypt data sent by said third entity via said network using a third encryption algorithm. The third encryption device may be adapted to pass network metric data concerning at least one route between said third entity and said third destination to said third entity without subjecting said network metric data to said third decryption algorithm.

It may be that the third encryption and decryption algorithms are suitable for communications at a security classification different from the security classifications for which the first and/or second encryption and decryption algorithms are suitable.

In some forms of the present invention, the said network metric data can only be used to update a predefined entry in a table. The present invention may prevent said network metric data from being used for any purpose other than updating said predefined entry in said table.

The entities referred to above may be users. Alternatively, the some or all of the entities may be groups of users, organisations or networks in their own right.

According to another aspect of the invention, there is provided a communications system comprising a first entity, a first encryption device and a network, wherein said first encryption device is adapted to: encrypt data sent by said first entity via said network using a first encryption algorithm and/or decrypt data sent to said first entity via said network using a first decryption algorithm, wherein said first encryption device is adapted to pass network metric data (often referred to as network metrics) to said first entity without subjecting said network metric data to said first decryption algorithm.

It will be appreciated that features described with reference to one aspect of the invention are equally applicable to any other aspects of the invention.

Devices and methods in accordance with the invention will now be described, by way of example only, with reference to the accompanying schematic drawings in which:

FIG. 3 shows a system, indicated generally by the reference numeral 40 that demonstrates a problem addressed by the present invention.

Figure 1:
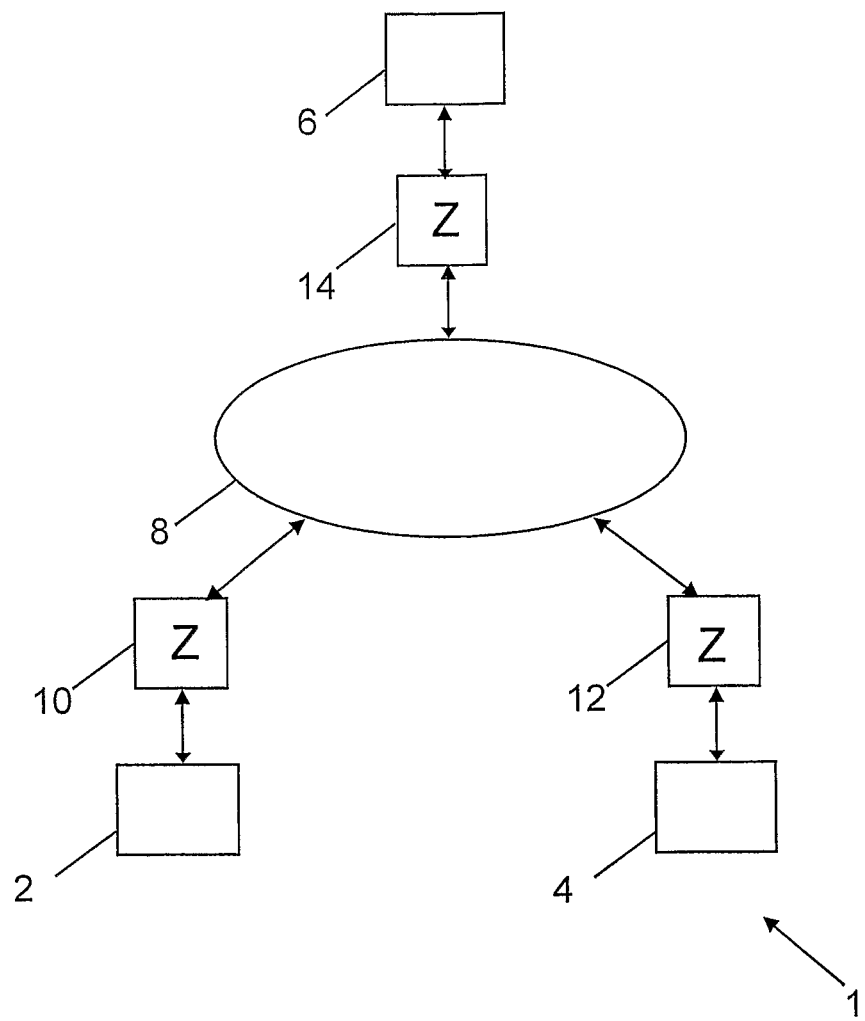
FIG. 1 is a block diagram of a first exemplary secure communication system.
Figure 2:
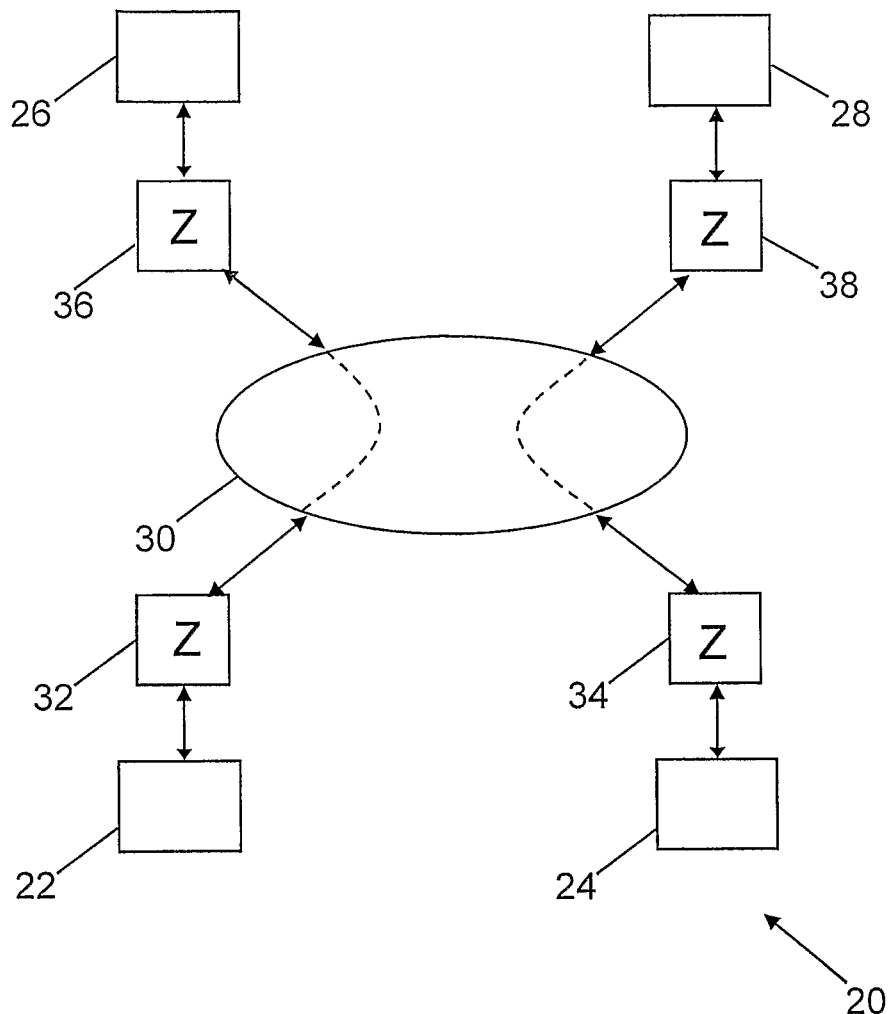
FIG. 2 is a block diagram of a second exemplary secure communication system.
Figure 3:
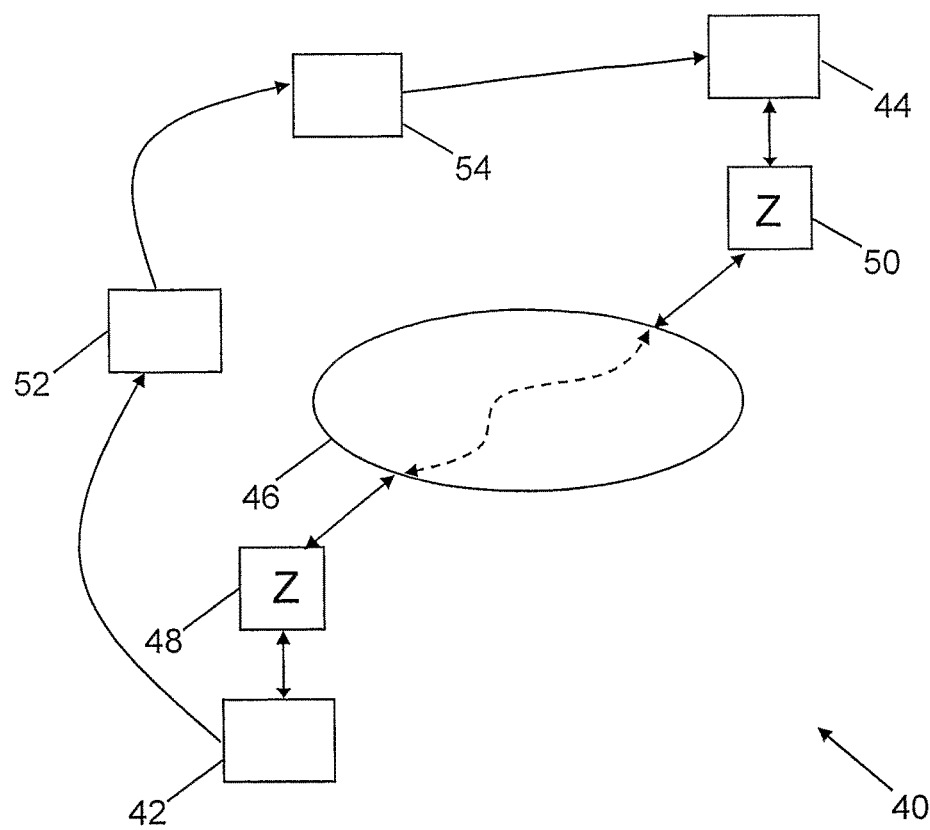
FIG. 3 is a block diagram of a variant of the communication systems of FIGS. 1 and 2 demonstrating an aspect of the present invention.

The system 40 comprises a first entity 42, a second entity 44 and a network 46. The first entity 42 is connected to the network via a first encryption device 48: the second entity 44 is connected to the network via a second encryption device 50. The system also comprises third and fourth entities 52 and 54. The first entity 42 is able to communicate with the third entity 52, the third entity 52 is able to communicate with the fourth entity 54 and the fourth entity 54 is able to communicate with the second entity 44. Thus, the first and second entities 42 and 44 are able to communicate either via the network 46, or via the third and fourth entities 52 and 54.

The third and fourth entities 52 and 54 may be another network, to which the first entity 42 and the second entity 44 both have access.

Assume that the first entity 42 wishes to send a message to the second entity 44. The system 40 provides two routes through which that message could be sent—either via the network 46 or via third and fourth entities 52 and 54. In order to decide which route to use, the first entity may wish to compare metric data concerning the two routes in a manner well known in the art. However, such metric data for the network 46 is not available to the first entity 42.

Figure 4:
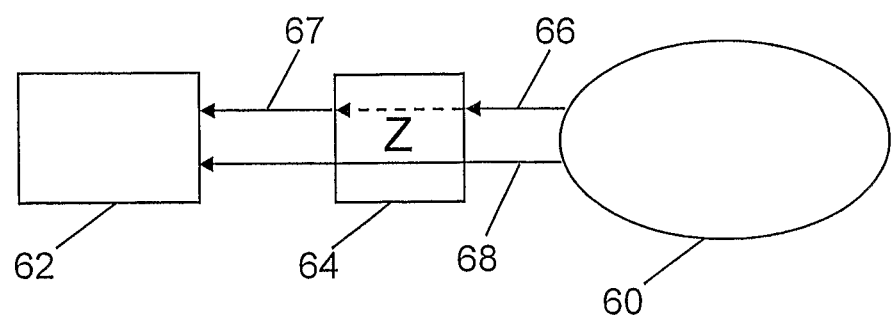
FIG. 4 is a block diagram demonstrating an aspect of the present invention.

FIG. 4 shows a portion of a communications system incorporating an aspect of the present invention. FIG. 4 shows a network 60 connected to an entity 62 via an encryption device 64. As in the exemplary systems 1 and 20 described above, the encryption device is used to encrypt data output by the entity 62 to the network 60 and is used to decrypt data from the network 60 that is addressed to the entity 62.

In the normal use of the encryption device 64, encrypted data 66 is passed from the network 60 to the ciphertext side of the encryption device 64. That data is then decrypted and provided as data 67 on the plaintext side of the device 64.

As shown in FIG. 4, the encryption device 64 also receives second data 68, which data is network metric data. The metric data 68 is not encrypted and simply passes through the device 64 without being decrypted.

By enabling the metric data to pass through the device 64 without undergoing decryption, the problem of giving the entity access to metric data is solved in a simple and elegant manner.

It should be noted that in the system 60, whilst unencrypted data is allowed to pass from the network 60 to the entity 62, no unencrypted data is allowed to pass from the entity to the network. Users are typically more concerned with the potential risks of passing unencrypted data from an entity (such as a user) to the network than in the other direction.

A potential problem with the arrangement described above with reference to FIG. 4 is that the passing of encrypted data from the network direct to entities leads entities potentially vulnerable to attack, for example from viruses or Trojans. This issue can, however, be addressed by limiting the data that the network is allowed to pass to the entity to one of a predetermined number of data words. A firewall could provide such a security feature.

By way of example, assume that the network 60 passes a routing metric to an entity making use of the network. The network will have full information regarding the routing metric, but is restricted to defining the metric by one of a small number of pre-selected binary words. Further, the chosen word can only be used to update a particular row of a table maintained at the entity. The table can be accessed by the entity when deciding whether or not to use the network. In this way, the entity is given access to routing metrics, but the security risk posed by enabling unencrypted data to pass directly from the network to the entity is reduced to a level that most users would deem acceptable.

The invention claimed is:

1. A communications system comprising a first entity, a first encryption device and a network, wherein said first encryption device is adapted to decrypt, using a first decryption algorithm, data sent from a first destination to said first entity via said network, to block network metric data that is not one of a predetermined set of data words and to pass network metric data concerning at least one route between said first entity and said first destination to said first entity without subjecting said network metric data to said first decryption algorithm.

2. A communications system as claimed in claim 1, wherein said first encryption device is adapted to encrypt data sent by said first entity via said network using a first encryption algorithm.

3. A communications system as claimed in claim 1, further comprising a second entity and a second encryption device, wherein said second encryption device is adapted to decrypt, using a second decryption algorithm, data sent from a second destination to said second entity via said network.

4. A communications system as claimed in claim 3, wherein said second encryption device is arranged to encrypt data sent by said second entity via said network using a second encryption algorithm.

5. A communications system as claimed in claim 3, wherein the second encryption device is adapted to pass network metric data concerning at least one route between said second entity and said second destination to said second entity without subjecting said network metric data to said second decryption algorithm.

6. A communications system as claimed in claim 3, wherein said second encryption device is adapted to block network metric data that is not one of a predetermined set of data words.

7. A communications system as claimed in claim 3, further comprising a third entity and a third encryption device, wherein the third encryption device is adapted to decrypt, using a third decryption algorithm, data sent from a third destination to said third entity via said network.

8. A communications system as claimed in claim 7, wherein said third encryption device is arranged to encrypt data sent by said third entity via said network using a third encryption algorithm.

9. A communications system as claimed in claim 7, wherein the third encryption device is adapted to pass network metric data concerning at least one route between said third entity and said third destination to said third entity without subjecting said network metric data to said third decryption algorithm.

10. A communications system as claimed in claim 1, wherein said network metric data includes data transfer cost data.

11. A communications system as claimed in claim 1, wherein said network metric data includes quality-of-service data.

12. A communications system as claimed in claim 1, wherein said network metric data can only be used to update a predefined entry in a table.

13. A method of operating a secure communications system in which one or more entities send data to one or more other entities of the system via a network, wherein at least some of said data is encrypted and decrypted using encryption and decryption algorithms, the method comprising the steps of sending network metric data concerning at least one route between one entity and another entity from said network to one or more of said entities without subjecting the network metric data to said decryption algorithm, and preventing network metric data from being passed to an entity if said network metric data is not one of a predetermined set of data words.

14. A method as claimed in claim 13, further comprising the step of using said network metric data to update a predefined entry in a table.

\* \* \* \* \*